Sept. 6, 1966  W. F. HIRSCH  3,270,767
FAUCET CONNECTOR
Filed Jan. 2, 1964

INVENTOR.
WALTER F. HIRSCH
BY
E. H. Schmidt
ATTORNEY.

3,270,767
FAUCET CONNECTOR
Walter Franz Hirsch, 6271 SW. 26th St., Miami, Fla.
Filed Jan. 2, 1964, Ser. No. 335,311
4 Claims. (Cl. 137—268)

This invention relates to faucet coupling devices and is directed particularly to a connector or coupling for joining a hose to the nozzle or spout of a water faucet. Faucet connectors are commonly used for joining flexible hose or tubing to bathroom faucets for shower and spray equipment, hygienic douches and the like. In the use of such equipment, the water pressures developed at the coupling connection are often very great, sometimes resulting in leakage and blow-apart at the juncture. The principal object of the invention, accordingly, is to provide an improved faucet connector for flexible tubes or hoses which will withstand uncommonly high internal fluid pressures without leakage or separation.

Another object is to provide a faucet connector of the character above described which seals by compression against the inner wall of a faucet nozzle or spout, and wherein connection is effected simply by turning a thumbscrew on the connector.

A more particular object is to provide a faucet connector of the above nature having a chamber for receiving germicidal or other medicinal tablets to be gradually and uniformly dissolved in the water flowing therethrough for use in douching.

Yet another object is to provide a faucet connector of the above nature which can be inexpensively manufactured of synthetic plastic materials and which will be simple in structure, easy to use, compact and attractive in appearance, easy to clean and durable in use.

Other objects, features and advantages of the invention will be apparent from the following description when read with reference to the accompanying drawings.

In the drawings, wherein like reference numerals denote corresponding parts throughout the several views.

Figure 1:
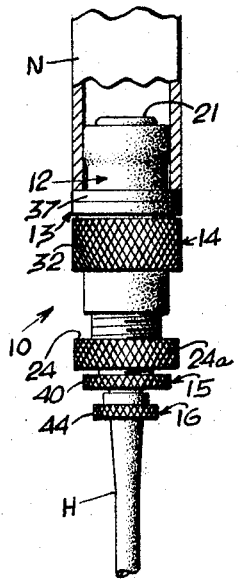
FIG. 1 is a side view of a faucet connector embodying the invention shown in use connected to the nozzle of a water faucet.
Figure 2:
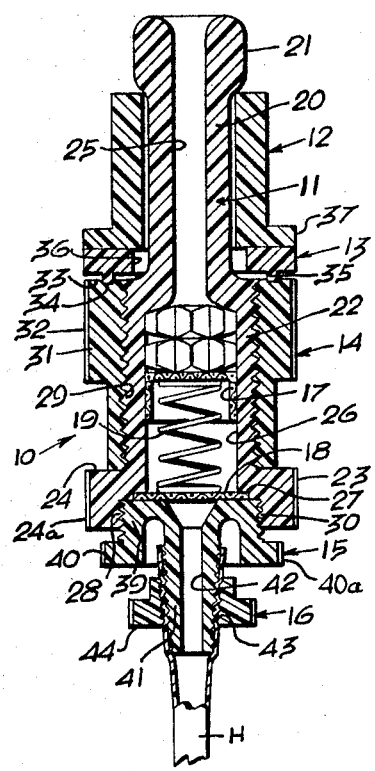
FIG. 2 is a longitudinal cross-sectional view, on an enlarged scale, of the connector illustrated in FIG. 1, shown in release or disconnect condition.
Figure 3:
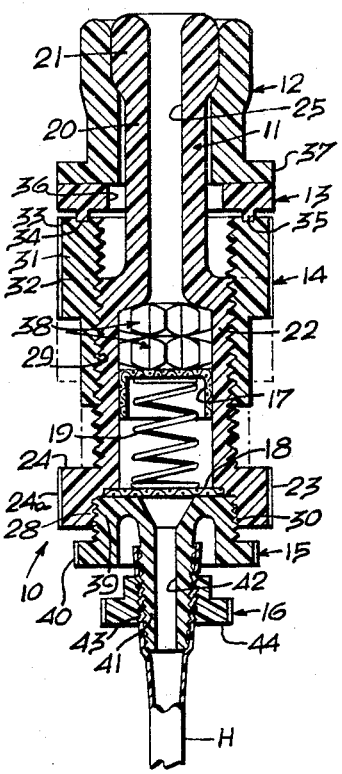
FIG. 3 is a cross-sectional view similar to FIG. 2 but showing the connector in connecting condition.
Figure 4:
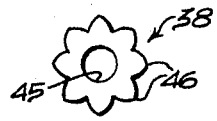
FIG. 4 is a top view of a medicinal tablet for use with the connector.
Figure 5:
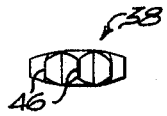
FIG. 5 is an elevational view of the tablet.

Referring in detail to the drawings, the numeral 10 in FIGS. 1, 2 and 3 designates a faucet connector embodying the invention, the same being comprised, generally, of a body member 11, a sleeve 12, a washer 13, an actuating thumb-nut 14, a tablet retainer member 15, a hose adapter member 16, a pair of strainer members 17 and 18, and a helical compression spring 19.

The body member 11, which is preferably of a transparent synthetic plastic material, is formed at one end with a tubular nozzle portion 20, the outer end of which is rounded into a tip portion or head 21 of somewhat increased external diameter. The inner end of the nozzle portion 20 is integrally formed with a central body portion 22 of increased diameter which, in turn, at its outer end, is integrally formed with a short end portion 23 of still further increased diameter to form an external annular shoulder 24 with said central body portion. The end portion 23 of the body member 11 is knurled or serrated, as indicated at 24a. The central opening 25 in the nozzle portion 20 of the body member 11 communicates, at its inner end, with a cylindrical, coaxial chamber 26 in the central portion 22 of said body member which, at its outer end, communicates with a short cylindrical opening of increased diameter 27 in the end portion 23 of said body member which in turn communicates with a relatively larger cylindrical opening 28 in said end portion. The outer cylindrical wall of the central portion 22 of the body member 11 is externally threaded, as indicated at 29, and the internal cylindrical wall of the cylindrical opening 28 in the end portion 23 of said body member is internally threaded, as indicated at 30.

The actuating thumb-nut 14 is threadedly received on the externally-threaded central portion 22 of the body member 11 and is substantially coextensive with said central portion. The inner end of the actuating thumb-nut 14 seats down upon the annular shoulder 24 of the body member 11 as a limit position when the device is in disconnect condition, as illustrated in FIG. 2. The outer end of the actuating thumb nut 14 is formed with an increased diameter portion 31, the outer periphery of which is preferably serrated or knurled, as indicated at 32, for manual gripping purposes. The outer annular face 33 of the thumb-nut 14 is formed with a central, coaxial, shallow groove 34 of rectangular cross-sectional shape received within which is a coaxial annular projection 35 formed on the underside of the washer 13. As illustrated in FIGS. 2 and 3, the height of the projection 35 of the washer 13 is greater than the depth of the groove 34, whereby the underside of the washer is supported in spaced relation from the outer annular face 33 of the thumb-nut 14 for minimal face-to-face frictional contact. The central opening 36 of the washer 13 is substantially greater than the external diameter of the nozzle portion 20 of the body member 11.

The sleeve 12 is disposed circumjacent the nozzle portion 20 of the body member 11 and is formed at its inner end with an annular flange 37, the outer surface of which normally seats against the outer surface of the washer 13. The internal diameter of the sleeve 12 is somewhat greater than the outer diameter of the nozzle portion 20 of the body member 11, and its length is such that its outer end falls just short of the underside of the head 21 of said nozzle portion when the device is in disconnect condition as illustrated in FIG. 2.

Means is provided for replaceably supporting one or more medicinal tablets 38 within the cylindrical chambers 26 of the body member 11. To this end, the tablet retainer member 15 is formed with an externally-threaded plug portion 39 received in the internally-threaded opening 28 at the lower end of the body member 11. The outer end of the retainer member 15 is formed with an increased diameter portion 40 serrated or knurled as indicated at 40a to facilitate manual attachment and removal. The retainer member 15 is formed at its outside with an outwardly-projecting, tapered, externally-threaded nozzle portion 41, and is provided with an axial through opening 42 for the passage of water or other fluid. The hose adapter member 16 is formed with a tapered, internally-threaded opening 43 and has a serrated or knurled cylindrical portion 44 of increased diameter to facilitate screwing on the externally-threaded nozzle 41 of the retainer member 11. The retainer member 15 and the hose adapter member 16 together constitute means for removably securing one end of a flexible tube or hose H thereto by jamming therebetween in the coacting threads, as is best illustrated in FIGS. 2 and 3.

As illustrated in FIGS. 2 and 3, the retainer member 15, when screwed in place in the body member 11, holds the disc-shaped lower strainer member 18 seated in place in the opening 27 of said body member. Tablets 38 are resiliently held in place against the inner end of the chamber 26 of the body member 11 by the helical compression spring 19 constrained between the lower strainer member 18 and the upper, cup-shaped strainer member 17.

The various parts of the faucet connector 10 are preferably fabricated of clear synthetic plastic materials, with the possible exception of the strainer members 17 and 18 which may be of wire mesh. The transparency of the body member 11 and the actuating thumb-nut 14 permit visual inspection of the condition of the tablets 38 as they dissolve away with the flow of water.

In use, the nozzle end of the faucet connector, in release condition as illustrated in FIG. 2, will be pushed up into the water outlet opening of the nozzle N of an ordinary household water faucet and the actuating thumb-nut 14 will be screwed outwardly of the body member 11 while holding said body member in relatively fixed position. The gradual withdrawal of the actuating thumb-nut will cause the outer end of the sleeve 12, which is formed of a comparatively resilient material, to be squeezed out and over the founded head 21 at the outer end of the nozzle portion 20 and jam-sealed against the inner wall of the faucet nozzle N as illustrated in FIG. 1. The minimal frictional contact of the underside of the washer 13 with the outer annular face 33 of the thumb-nut 14 contributes substantially to the ease of operation of the connector. To release the connector, it is only necessary to screw the thumb-nut 14 inwardly, to its limit position as shown in FIG. 2, and as illustrated by the broken-line representation thereof in FIG. 3, after which a sharp push upwardly into the connected nozzle serves to push the head portion 21 outwardly of the outer end of the sleeve 12 to complete the disconnection.

The central flow openings of the nozzle portion 20 of the body member 11 and the nozzle portion 41 of the retainer member 15 are of such restricting diameters that the water flow pressure is reduced to a few pounds per square inch. Preferably, a plurality of retainer members 15 will be supplied, having different nozzle internal diameters to permit the selection of various pressures as required down to as low as two pounds per square inch.

While I have illustrated and described herein only one form in which the invention may conveniently be embodied in practice, it is to be understood that this form is presented by way of example only and not in a limiting sense. The invention, in brief, comprises all the modifications and emobdiments coming within the scope and spirit of the following claims.

What I claim as new and desire to secure by Letters Patent is:

1. In a faucet connector, the combination comprising, a body member having an elongated, tubular nozzle portion at one end and an increased diameter portion at the other end, said increased diameter portion having a cylindrical inner chamber coaxial with and communicating at one end with the opening at the inner end of said tubular nozzle portion, the outer end of said nozzle having integrally formed therewith a head portion of increased external diameter, a resilient sleeve member circumjacent said nozzle portion and movable axially therealong, said sleeve member having an internal diameter less than the outer diameter of said head portion, screw means for forcing the outer end of said sleeve member in expanded disposition over said nozzle head portion, and means for connecting a hose to said body member and in communication with the other end of said chamber, said screw means comprising an exterior screw thread formed along the outside of said increased diameter portion of said body member, an actuating thumb-nut threadedly received on said screw thread and providing an annular shoulder facing said sleeve member, and an annular washer circumjacent said nozzle portion between said sleeve member and said annular shoulder, said annular shoulder of said thumb-nut being formed with a central, coaxial groove, and a coaxial annular projection on said washer of greater height than the depth of said groove for minimizing the frictional contact between said washer and said shoulder.

2. A faucet connector as defined in claim 1 including means for resiliently holding a soluble tablet against one end of the interior chamber of said body member.

3. A faucet connector as defined in claim 1 wherein said hose connecting means comprises a threaded opening in said body member and in communication with the other end of said chamber, a retainer member threadable in said threaded opening and having a tapered, externally-threaded nozzle portion adapted to be inserted within the end of a length of hose, and a nut member having a tapered thread and operative to screw on said threaded nozzle portion through the end portion of a hose received on said threaded nozzle portion.

4. A faucet connector as defined in claim 3, including means for resiliently holding a plurality of soluble tablets against said one end of the interior chamber of said body member, said holding means comprising a strainer member movable from end to end along said chamber, and a compression spring constrained between said strainer member and the inner end of said retainer member.

References Cited by the Examiner

UNITED STATES PATENTS

| | | | |
|---|---|---|---|
| 48,709 | 7/1865 | Emory | 285—251 |
| 702,495 | 6/1902 | Shinn | 285—8 X |
| 2,508,827 | 5/1950 | Holden | 285—8 |
| 3,016,941 | 1/1962 | Coldren | 151—38 |
| 3,114,969 | 12/1963 | Roth | 285—239 X |

M. CARY NELSON, *Primary Examiner.*

H. T. KLINKSIEK, *Examiner.*